(12) United States Patent
Hingorani et al.

(10) Patent No.: US 9,360,364 B2
(45) Date of Patent: Jun. 7, 2016

(54) SENSORY-AND-LOGIC SYSTEM AND METHOD HAVING ULTRAVIOLET LIGHT ESTIMATION FROM VISIBLE LIGHT

(71) Applicant: MICROSOFT TECHNOLOGY LICENSING, LLC, Redmond, WA (US)

(72) Inventors: Vinod L. Hingorani, Redmond, WA (US); Ryna Karnik, Redmond, WA (US); Jeremy J. Lees, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 80 days.

(21) Appl. No.: 14/292,439

(22) Filed: May 30, 2014

(65) Prior Publication Data

US 2015/0346024 A1    Dec. 3, 2015

(51) Int. Cl.
*G01J 1/42* (2006.01)

(52) U.S. Cl.
CPC ............... *G01J 1/429* (2013.01); *G01J 1/4204* (2013.01); *G01J 2001/4266* (2013.01)

(58) Field of Classification Search
CPC .................. G01J 1/4228; G01N 21/33; G01N 2201/1235
USPC ...... 250/214 AL, 214 R, 214.1, 203.4, 338.1, 250/370.15, 365, 372; 600/310, 300, 301; 327/514, 515; 356/51, 53
See application file for complete search history.

(56) References Cited

U.S. PATENT DOCUMENTS

| | | | |
|---|---|---|---|
| 7,446,303 B2 | 11/2008 | Maniam et al. | |
| 8,044,363 B2 | 10/2011 | Ales et al. | |
| 8,084,728 B2 | 12/2011 | Tsang | |
| 8,142,357 B2* | 3/2012 | Suyama | A61B 5/02055 368/11 |
| 2004/0108191 A1 | 6/2004 | Su et al. | |
| 2007/0108389 A1 | 5/2007 | Makela et al. | |
| 2008/0265170 A1 | 10/2008 | Ales et al. | |
| 2010/0187406 A1 | 7/2010 | Van et al. | |
| 2010/0253661 A1 | 10/2010 | Hashimoto | |
| 2011/0098583 A1 | 4/2011 | Pandia et al. | |
| 2011/0222375 A1 | 9/2011 | Tsubata et al. | |

FOREIGN PATENT DOCUMENTS

GB           2181833 A       4/1987

OTHER PUBLICATIONS

"Silicon Labs Introduces Industry's First Digital Ultraviolet Index Sensors", Published on: Feb. 10, 2014, Available at: http://investor.silabs.com/releasedetail.cfm?ReleaseID=824441.

(Continued)

*Primary Examiner* — Que T Le
(74) *Attorney, Agent, or Firm* — Brandon Roper; Judy Yee; Micky Minhas

(57) ABSTRACT

A method of measuring ultraviolet light includes observing an ultraviolet portion of ambient light with an ultraviolet light sensor, measuring an intensity of a visible portion of the ambient light with a visible light sensor, and estimating an intensity of the ultraviolet portion of the ambient light based on the measured intensity of the visible portion of the ambient light if the observed ultraviolet portion of the ambient light exceeds a threshold intensity.

20 Claims, 4 Drawing Sheets

(56) References Cited

OTHER PUBLICATIONS

Polzer, et al., "Filter-Less Vertical Integrated RGB Color Sensor for Light Monitoring", In Proceedings of the 34th International Convention, May 23, 2011, 5 pages.

Zhang, et al., "See UV on Your Skin: An Ultraviolet Sensing and Visualization System", In Proceedings of the 8th International Conference on Body Area Networks, Sep. 30, 2013, 7 pages.

Fingas, Jon, "TomTom's new GPS watches track your heart rate without a chest strap (update: US pricing)", http://www.engadget.com/2014/04/03/tomtom-cardio-gps-watches/, Apr. 3, 2014, 10 pages.

Goode, Lauren, "Samsung's New Gear Fit Needs to Work on the "Fit" Part", http://recode.net/2014/04/08/samsungs-new-gear-fit-needs-to-work-on-the-fit-part/, Apr. 8, 2014, 10 pages.

"Samsung Gear Fit, Gear 2 and Gear 2 Neo go on sale worldwide", NDTV Gadgets, http://gadgets.ndtv.com/others/news/samsung-gear-fit-gear-2-and-gear-2-neo-go-on-sale-worldwide-507220, Apr. 11, 2014, 3 pages.

Poeter, Damon, "Meet Simband, Samsung's Next-Gen Health Tracker", http://www.pcmag.com/article2/0,2817,2458663,00.asp, May 28, 2014, 5 pages.

ISA European Patent Office, International Search Report and Written Opinion Issued in Patent Application No. PCT/US2015/032769, Sep. 9, 2015, WIPO, 11 pages.

* cited by examiner

SENSORY-AND-LOGIC SYSTEM AND METHOD HAVING ULTRAVIOLET LIGHT ESTIMATION FROM VISIBLE LIGHT

DETAILED DESCRIPTION

Ultraviolet light is correlated with adverse skin conditions (e.g., sunburn, melanoma). As such, human subjects may wish to estimate their exposure to ultraviolet light to mitigate the risk of developing such conditions as well as for other purposes, such as estimating synthesis of vitamin D. To enable on-the-fly ultraviolet light sensing regardless of location, a sensor configured to sense ultraviolet light may be mounted in a worn device. Such a sensor may be shielded from environmental hazards (e.g., sweat or water) that can potentially inhibit operation of the sensor. Plastic shields, however, significantly attenuate ultraviolet light, reducing the effectiveness of the ultraviolet light sensor.

Ultraviolet sensing may be used to infer location information. Decreased ultraviolet levels sensed by an ultraviolet light sensor may be used as an indication that the sensor is positioned at an indoors location, or at an outdoors location that is significantly shielded from ultraviolet light. Increased ultraviolet levels may be used as an indication that the sensor is at an outdoors location, or at an indoors location that is not significantly shielded from ultraviolet light. A computing device may utilize output from the sensor to infer whether its location corresponds to an outdoors or indoors, or ultraviolet-shielded or unshielded, location. This type of location determination may be used to adjust one or more aspects of the computing device and/or to trigger one or more events or notifications.

Figure 1A:
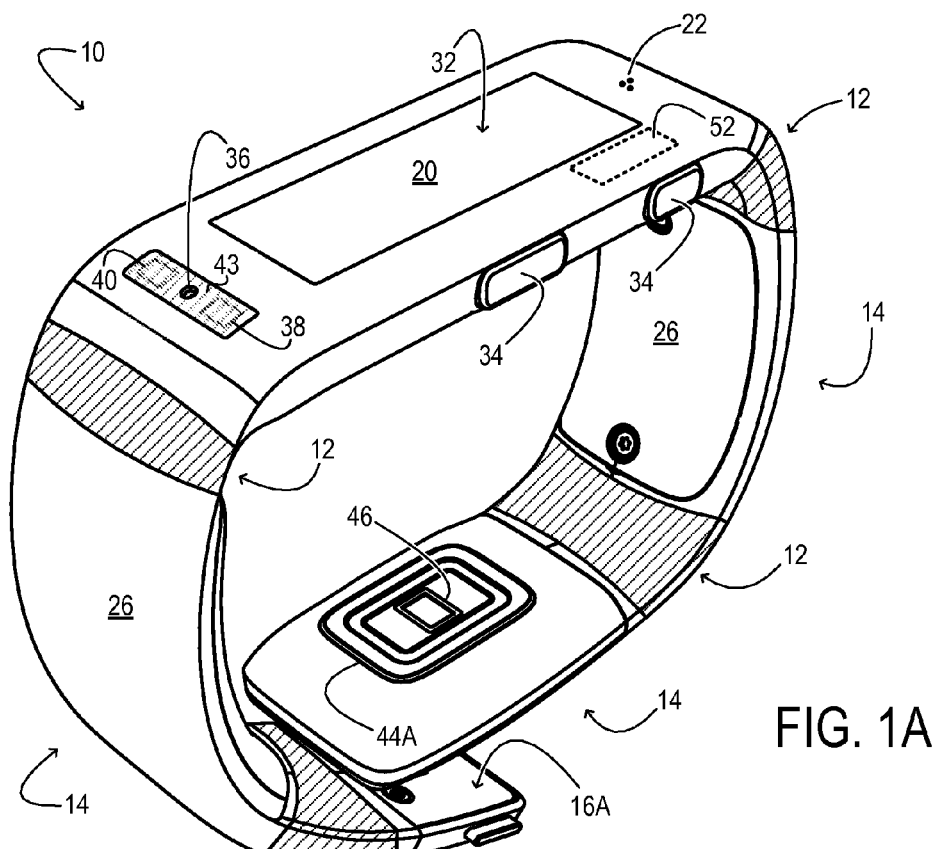
FIGS. 1A and 1B show aspects of an example sensory-and-logic system.
Figure 1B:
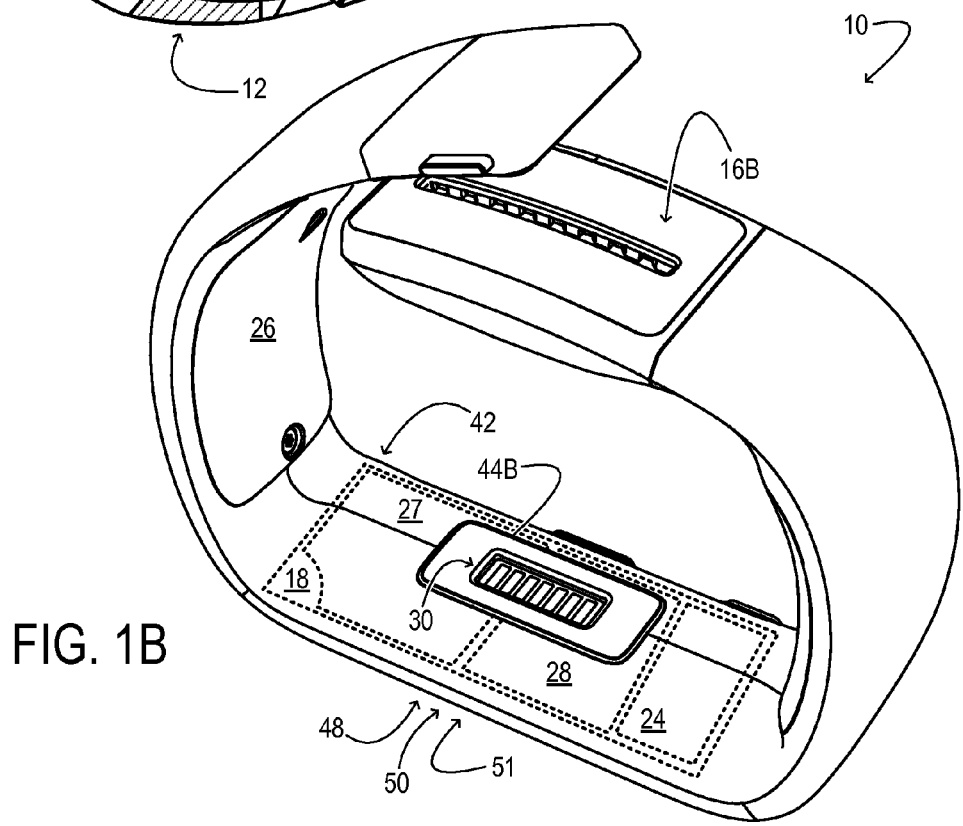

FIGS. 1A and 1B show aspects of an example sensory-and-logic system in the form of a wearable electronic device 10. Device 10 is a non-limiting example of a device in which ultraviolet light sensing may be carried out to estimate ultraviolet exposure and determine whether the device is at an outdoors or an indoors, or ultraviolet-shielded or unshielded, location. It will be appreciated, however, that other devices including non-wearable devices may implement the approaches described herein. These other devices include, for example, tablets, smartphones, and laptops. The illustrated device is band-shaped and may be worn around a wrist. Device 10 includes at least four flexion regions 12 linking less flexible regions 14. The flexion regions of device 10 may be elastomeric in some examples. Fastening componentry 16A and 16B is arranged at both ends of the device. The flexion regions and fastening componentry enable the device to be closed into a loop and to be worn on a user's wrist. In other implementations, wearable electronic devices of a more elongate band shape may be worn around the user's bicep, waist, chest, ankle, leg, head, or other body part. The device, for example, may take the form of eye glasses, a head band, an arm-band, an ankle band, a chest strap, or an implantable device to be implanted in tissue.

Wearable electronic device 10 includes various functional components integrated into regions 14. In particular, the electronic device includes a compute system 18, display 20, loudspeaker 22, communication suite 24, and various sensors. These components draw power from one or more energy-storage cells 26. A battery—e.g., a lithium ion battery—is one type of energy-storage cell suitable for this purpose. Examples of alternative energy-storage cells include super- and ultra-capacitors. In devices worn on the user's wrist, the energy-storage cells may be curved to fit the wrist, as shown in the drawings.

In general, energy-storage cells 26 may be replaceable and/or rechargeable. In some examples, recharge power may be provided through a universal serial bus (USB) port 30, which includes a magnetic latch to releasably secure a complementary USB connector. In other examples, the energy storage cells may be recharged by wireless inductive or ambient-light charging. In still other examples, the wearable electronic device may include electro-mechanical componentry to recharge the energy storage cells from the user's adventitious or purposeful body motion. For example, batteries or capacitors may be charged via an electromechanical generator integrated into device 10. The generator may be turned by a mechanical armature that turns while the user is moving and wearing device 10.

In wearable electronic device 10, compute system 18 is situated below display 20 and operatively coupled to the display, along with loudspeaker 22, communication suite 24, and the various sensors. The compute system includes a data-storage machine 27 to hold data and instructions, and a logic machine 28 to execute the instructions. Aspects of the compute system are described in further detail with reference to FIG. 4.

Display 20 may be any suitable type of display. In some configurations, a thin, low-power light emitting diode (LED) array or a liquid-crystal display (LCD) array may be used. An LCD array may be backlit in some implementations. In other implementations, a reflective LCD array (e.g., a liquid crystal on silicon, LCOS array) may be frontlit via ambient light. A curved display may also be used. Further, AMOLED displays or quantum dot displays may be used.

Communication suite 24 may include any appropriate wired or wireless communications componentry. In FIGS. 1A and 1B, the communication suite includes USB port 30, which may be used for exchanging data between wearable electronic device 10 and other computer systems, as well as providing recharge power. The communication suite may further include two-way Bluetooth, Wi-Fi, cellular, near-field communication and/or other radios. In some implementations, the communication suite may include an additional transceiver for optical, line-of-sight (e.g., infrared) communication.

In wearable electronic device 10, touch-screen sensor 32 is coupled to display 20 and configured to receive touch input from the user. The touch sensor may be resistive, capacitive, or optically based. Pushbutton sensors may be used to detect the state of push buttons 34, which may include rockers. Input from the pushbutton sensors may be used to enact a home-key or on-off feature, control audio volume, turn the microphone on or off, etc.

FIGS. 1A and 1B show various other sensors of wearable electronic device 10. Such sensors include microphone 36, visible light sensor (VLS) 38, ultraviolet light sensor (ULS) 40, and ambient temperature sensor 42. The microphone provides input to compute system 18 that may be used to measure the ambient sound level or receive voice commands from the wearer. Input from the VLS, ULS, and ambient temperature sensor may be used to assess aspects of the wearer's environment—e.g., the temperature, overall lighting level, and whether the wearer is indoors or outdoors, or at an ultraviolet-shielded or unshielded location, as described in further detail below.

VLS 38 is configured to receive ambient light and measure the intensity of a visible portion of the ambient light. As such, the VLS includes a photosensitive surface doped such that the photosensitive surface is sensitive to visible light and not ultraviolet light, in addition to a filter configured to transmit visible light to, and filter ultraviolet light from reaching, the photosensitive surface. In some implementations, the VLS may be an RGB visible light sensor sensitive to red, green, and blue wavelengths—for example, wavelengths ranging approximately from 400 nm to 700 nm.

Conversely, ULS 40 is configured to receive ambient light and observe an ultraviolet portion of the ambient light. Accordingly, the ULS includes a photosensitive surface doped such that the photosensitive surface is sensitive to ultraviolet light and not visible light, in addition to a filter configured to transmit ultraviolet light to, and filter visible light from reaching, the photosensitive surface. In some implementations, the ULS may be configured to sense light having wavelengths ranging approximately from 100 nm to 400, for example.

Both VLS 38 and ULS 40 are configured to output signals proportional to the types of light they respectively sense. As such, the VLS and ULS may both be analog light sensors whose output may be digitized and processed by compute system 18 to effect the processes described herein.

In the depicted implementation, VLS 38 and ULS 40 are both covered by a housing 43 configured to shield the sensors from debris and other environmental hazards such as water that may otherwise interfere with light sensing. Housing 43 may include a plastic or other material that attenuates ultraviolet light due to its bulk scattering properties. However, visible wavelengths may not be attenuated. Consequently, the measurements from the ULS may be less accurate than measurements from the VLS.

To provide ultraviolet light sensing while maintaining sensor protection via housing 43, the intensity of a visible portion of ambient light measured by VLS 38 may be used to estimate the intensity of an ultraviolet portion of the ambient light, as described in further detail below.

FIGS. 1A and 1B also show a pair of contact sensor modules 44A and 44B, which contact the wearer's skin when wearable electronic device 10 is worn. The contact sensor modules may include independent or cooperating sensor elements, to provide a plurality of sensory functions. For example, the contact sensor modules may provide an electrical resistance and/or capacitance sensory function, which measures the electrical resistance and/or capacitance of the wearer's skin. Compute system 18 may use such input to assess whether or not the device is being worn, for instance. In some implementations, the sensory function may be used to determine how tightly the wearable electronic device is being worn. In the illustrated configuration, the separation between the two contact-sensor modules provides a relatively long electrical path length, for more accurate measurement of skin resistance. In some examples, a contact sensor module may also provide measurement of the wearer's skin temperature. Arranged inside contact sensor module 44B in the illustrated configuration is an optical pulse rate sensor 46. The optical pulse-rate sensor may include an LED emitter and matched photodiode to detect blood flow through the capillaries in the skin and thereby provide a measurement of the wearer's pulse rate.

Wearable electronic device 10 may also include motion sensing componentry, such as an accelerometer 48, gyroscope 50, and magnetometer 51. The accelerometer and gyroscope may furnish inertial and/or rotation rate data along three orthogonal axes as well as rotational data about the three axes, for a combined six degrees of freedom. This sensory data can be used to provide a pedometer/calorie-counting function, for example. Data from the accelerometer and gyroscope may be combined with geomagnetic data from the magnetometer to further define the inertial and rotational data in terms of geographic orientation. The wearable electronic device may also include a global positioning system (GPS) receiver 52 for determining the wearer's geographic location and/or velocity. In some configurations, the antenna of the GPS receiver may be relatively flexible and extend into flexion regions 12.

Compute system 18, via the sensory functions described herein, is configured to acquire various forms of information about the wearer of wearable electronic device 10. Such information must be acquired and used with utmost respect for the wearer's privacy. Accordingly, the sensory functions may be enacted subject to opt-in participation of the wearer. In implementations where personal data is collected on the device and transmitted to a remote system for processing, that data may be anonymized. In other examples, personal data may be confined to the wearable electronic device, and only non-personal, summary data transmitted to the remote system.

Figure 2:
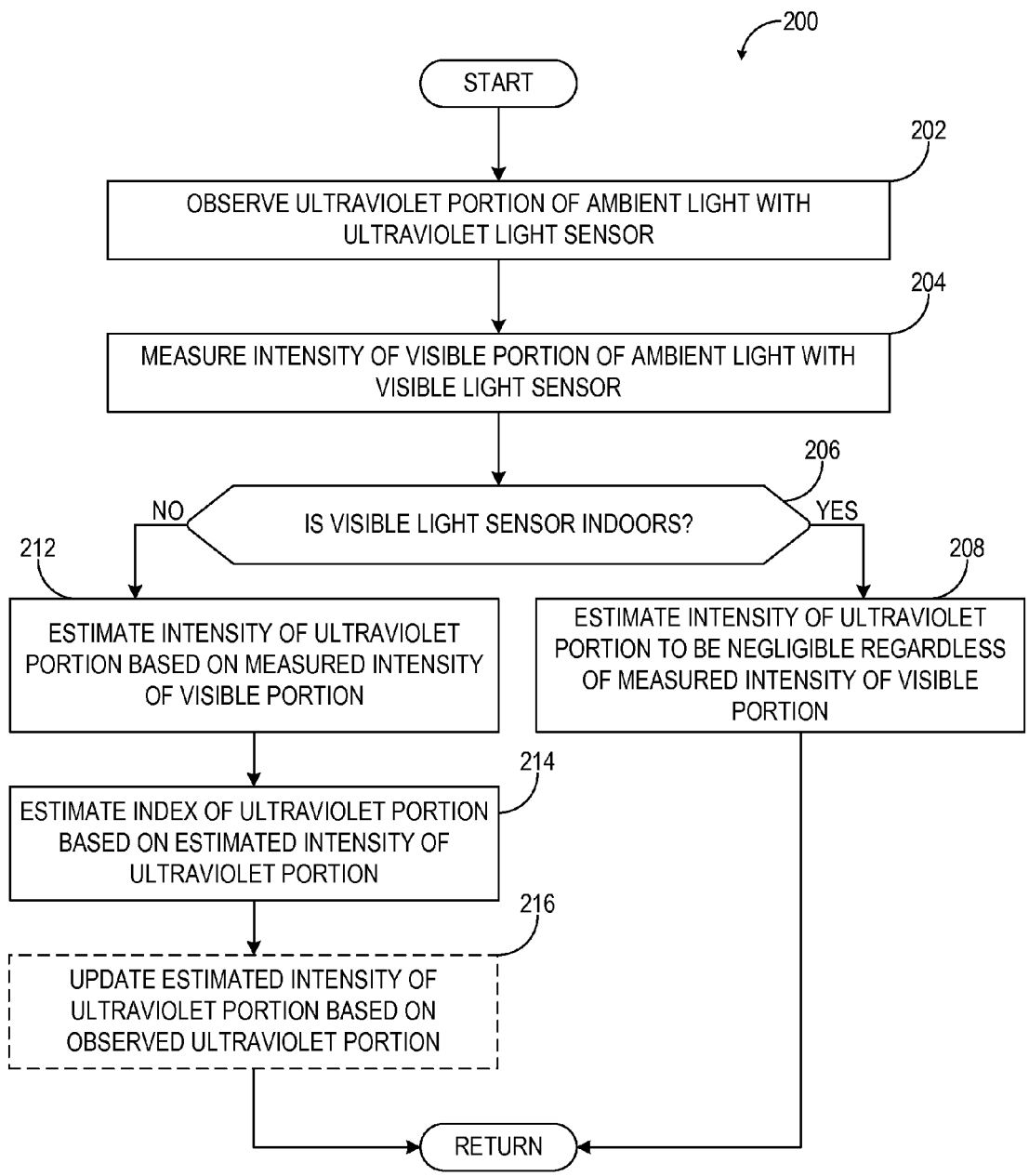
FIG. 2 shows a flowchart illustrating an example method for estimating the intensity of an ultraviolet portion of ambient light.

As described above, VLS 38 and ULS 40 are shielded by housing 43, which comprises a material that attenuates ultraviolet light. To maintain ultraviolet light sensing in the presence of such attenuation, the intensity of a visible portion of ambient light measured by the VLS may be used to estimate the intensity of an ultraviolet portion of the ambient light. Turning now to FIG. 2, a flowchart illustrating a method 200 for estimating the intensity of an ultraviolet portion of ambient light is shown. The method may be performed by wearable electronic device 10 of FIG. 1 or sensory-and-logic system 410 of FIG. 4, as examples.

At 202 of method 200, an ultraviolet portion of ambient light is observed with an ULS. The ultraviolet portion may be observed with ULS 40 of FIG. 1, for example. Next, at 204 of the method, the intensity of a visible portion of ambient light is measured with a VLS. The visible portion may be observed with VLS 38 of FIG. 1, for example.

Next, at 206 of method 200, it may be determined whether the VLS is at an indoors location or other location without significant ultraviolet light. With references to wearable electronic device 10 of FIG. 1, various mechanisms may be employed to determine whether the VLS is at an indoors location, including but not limited to determining a geographic location of the VLS based on signals received via GPS receiver 52, analyzing wireless communication signals received at communication suite 24, or receiving user input specifying whether the instant location of the VLS is indoors or outdoors. As another mechanism, it may be determined whether the ultraviolet portion of the ambient light observed at 202 exceeds a threshold intensity. If it is determined that the observed ultraviolet portion of the ambient light exceeds the threshold intensity, it can be inferred that the wearable electronic device is at an outdoors location or an indoors location with significant levels of ultraviolet light. On the other hand, if it is determined that the observed ultraviolet portion of ambient light does not exceed the threshold intensity, it can be inferred that the wearable electronic device is at an indoors location or an outdoors location that is substantially shielded from ultraviolet light.

If it is determined that the VLS is at an indoors location (YES), the method proceeds to 208 where the intensity of the ultraviolet portion of the ambient light is estimated to be negligible regardless of the intensity of the visible portion of the ambient light measured at 204. Here, it is assumed that significant attenuation of ultraviolet light has occurred due to the VLS being positioned at an indoors location, the attenuation being specifically caused by the bulk scattering properties of transmissive materials and/or reflection away from the indoors location, for example. Further, it may be determined that the wearable electronic device and/or the wearer wearing the device are indoors if the VLS is determined to be indoors.

If it is instead determined at 206 that the VLS is at an outdoors location (NO), the method proceeds to 212 where the intensity of the ultraviolet portion of the ambient light is estimated based on the intensity of the visible portion of the ambient light measured at 204. As one example, the ULS may be used in a binary manner to switch between two modes (e.g., negligible, non-negligible) of ultraviolet intensity estimation depending on whether the observed ultraviolet portion of the ambient light exceeds the threshold intensity. Here, observed ultraviolet portions of the ambient light exceeding the threshold intensity are interpreted as an indication that the VLS is at an outdoors location or an indoors location that is substantially transparent to or unshielded from ultraviolet light (e.g., a location at which ultraviolet light is attenuated by 10% or less). This interpretation includes the possibility that the VLS is in such an ultraviolet-transparent indoors location because transmission of ultraviolet light may occur at indoor locations, for example in those that include transmissive materials that are substantially transparent to ultraviolet light (e.g., transmitting 90% or greater of incident ultraviolet light).

Figure 3A:
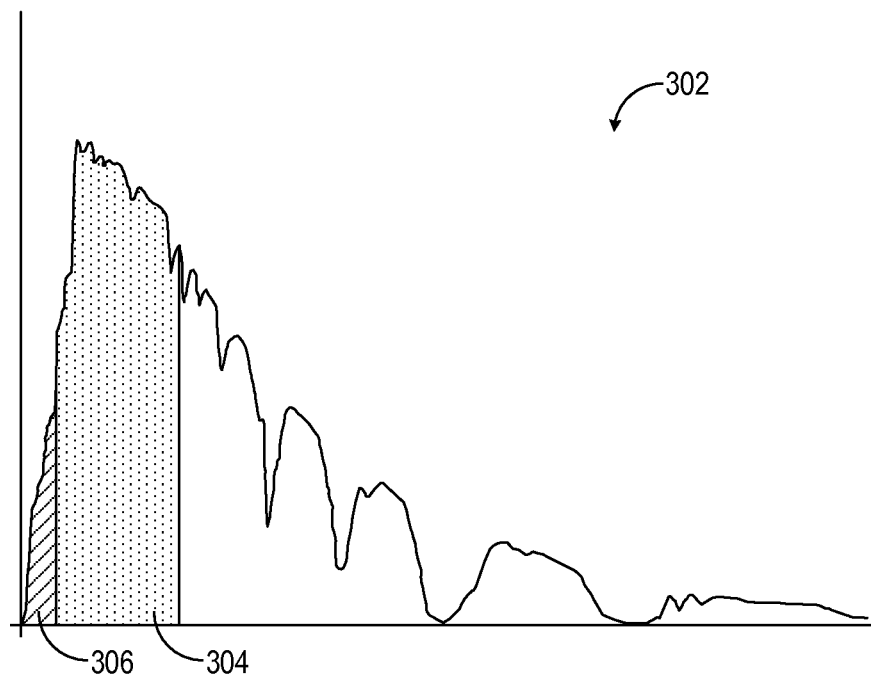
FIGS. 3A & 3B show example solar irradiance plots.

The intensity of the ultraviolet portion of the ambient light may be estimated based on the measured intensity of the visible portion of the ambient light, as the ratio of ultraviolet light to visible light is approximately constant (e.g., within 5%) in sunlight for a wide range of weather and atmospheric conditions, at outdoors locations and indoors locations where ultraviolet light is not substantially attenuated. Turning now to FIG. 3A, an exemplary solar irradiance plot 302 illustrating a spectrum of sunlight is shown. The plot specifically shows the intensity of sunlight, which may be normalized to a maximum of one, as a function of wavelength, which approximately ranges from 300 nm to 2500 nm. The plot represents solar irradiance for a set of exemplary atmospheric and environmental conditions (e.g., clear skies from which sunlight is received outdoors) in which any significant attenuation of the light in the depicted wavelength range is due to the atmosphere. Plot 302 shows both a visible portion 304 of the sunlight comprising wavelengths ranging approximately from 400 to 700 nm, as well as an ultraviolet portion 306 of the sunlight comprising wavelengths ranging approximately from 300 to 400 nm. As a non-limiting example, the ultraviolet portion and the visible portion of the sunlight approximately comprise 5% and 46% of the total sunlight shown in plot 302, respectively. In this example, the ratio of the ultraviolet portion to the visible portion is approximately 11%.

Figure 3B:
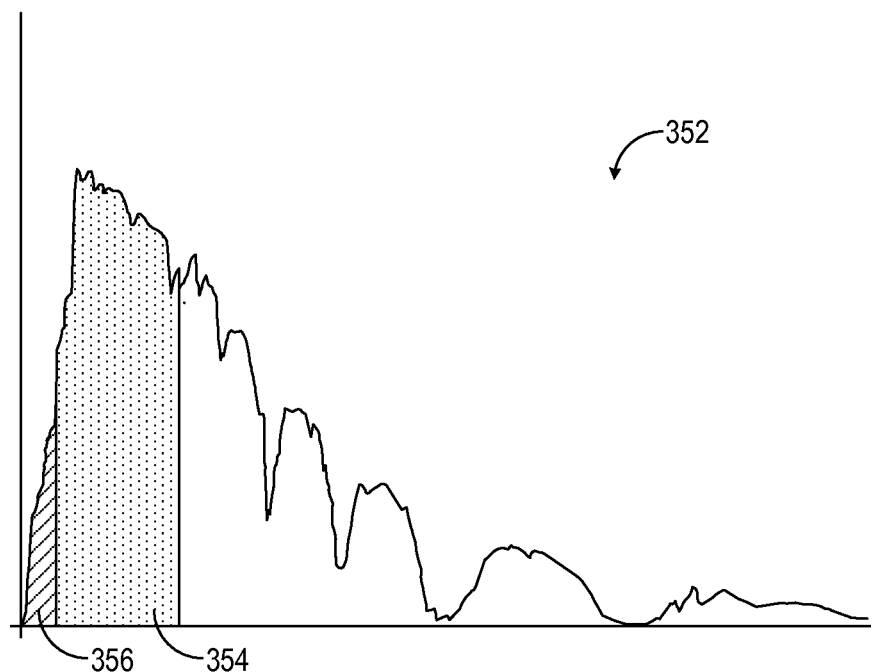

FIG. 3B shows another exemplary solar irradiance plot 352 illustrating another spectrum of sunlight. As with plot 302, plot 352 shows a spectrum comprising wavelengths ranging approximately from 300 nm to 2500 nm whose sole source of significant attenuation is the atmosphere. The spectrum of plot 352, however, represents sunlight received under a different set of atmospheric and environmental conditions than those under which the sunlight shown in plot 302 was received. Plot 352 includes a visible portion 354 and an ultraviolet portion 356 which have both decreased relative to visible portion 304 and ultraviolet portion 306, respectively. Despite the different atmospheric conditions under which plots 302 and 352 were received, however, the amount by which visible portion 354 and ultraviolet portion 356 have decreased is approximately equal. The relative constant proportionality of ultraviolet light to visible light in sunlight that is not significantly attenuated in the ultraviolet or visible bands following transmission through the atmosphere thus facilitates estimation of the intensity of an ultraviolet portion of ambient light based on a measured intensity of a visible portion of the ambient light.

Returning to FIG. 2, estimation of the intensity of the ultraviolet portion of the ambient light at 212 may thus be carried out by calculating a proportion of the intensity of the visible portion of the ambient light measured at 204. As a non-limiting example, the proportion may be 11% for scenarios in which ambient light is received under the conditions in which plots 302 and 352 (FIGS. 3A and 3B) were generated. In this way, the intensity of the ultraviolet portion of the ambient light may be accurately estimated without receiving a quantization of the intensity of the ultraviolet portion from the ULS, but merely an indication that the ultraviolet portion exceeds a threshold intensity. Accurate ultraviolet intensity estimation may thus be implemented on a wearable computing device despite attenuation of ultraviolet light due to a plastic housing covering the ultraviolet light sensor.

Next, at 214 of method 200, an index of the ultraviolet portion of the ambient light is estimated based on the intensity of the ultraviolet portion estimated at 212. As one example, the McKinlay-Diffey erythemal action spectrum may be used to estimate the ultraviolet index. The estimated ultraviolet index may be presented to a wearer of wearable computing device 10—e.g., via display 20.

Finally, at 216 of method 200, the intensity of the ultraviolet portion of the ambient light estimated at 212 may optionally be updated at 216 based on the ultraviolet portion observed at 202. Here, observed portions of ultraviolet light that exceed the threshold intensity at 206 prompt usage of the intensity of the ultraviolet portion of the ambient light measured by the ULS, in contrast to merely using the ULS as an indicator of whether or not a significant portion of ultraviolet light is present in ambient light. The intensity of the ultraviolet portion measured by the ULS is combined with the intensity of the ultraviolet portion measured by the VLS, which may increase the overall accuracy of estimation of the ultraviolet portion intensity.

Ultraviolet intensity (and/or index) estimated according to method 200 may be conveyed to a user in order to assist the user in assessing health effects resulting from exposure to ultraviolet light. With references to FIG. 1, the estimated ultraviolet intensity (and/or index) may be reported to a wearer of wearable computing device 10 via one or more suitable output devices—e.g., display 20 and/or loudspeaker 22. Alternatively or additionally, an alert may be provided when the estimated ultraviolet intensity (and/or index) exceeds a threshold, which may be predetermined or based on user input. In some implementations, instant ultraviolet intensities (and/or indices) may be compared with the threshold, while in other implementations intensities (and/or indices) may be tracked over time to form cumulative data, with the cumulative data being compared to appropriate thresholds. In yet another example, estimated ultraviolet intensities (and/or indices) may be reported to an external computing system for further processing—e.g., via communication suite 24 (FIG.

1) to a cloud computing system that enables users to remotely store and access data regarding their long term exposure to ultraviolet light.

Method 200 may be implemented in other contexts than those described above. For example, in some implementations, the method may be implemented on a computing device having a VLS and a ULS that comprise a single sensor. VLS 38 (FIG. 1) and ULS 40 (FIG. 1) may be combined to form a combined VLS-ULS sensor, for example. In this example, the combined VLS-ULS sensor includes a photosensitive surface having a first portion doped such that the first portion is sensitive to ultraviolet light and not visible light, and a second portion doped such that the second portion is sensitive to visible light and not ultraviolet light. The combined VLS-ULS sensor further includes a filter (e.g., a Bayer filter) partitioned such that filter portions aligned to the first portion of the photosensitive surface transmit ultraviolet light and filter visible light, and such that filter portions aligned to the second portion of the photosensitive surface transmit visible light and filter ultraviolet light. The combined VLS-ULS may facilitate concurrent measurement of ultraviolet and visible light.

In other implementations, an ambient light sensor configured to sense light types other than visible light may be used along with a ULS to estimate ultraviolet light intensity, as the proportion of ultraviolet light to some non-visible bands may be relatively constant. Such a non-visible light sensor may be used in addition to or in lieu of a VLS, and may be combined with the ULS and/or VLS to form a single combined light sensor as described above. As one non-limiting example, a light sensor configured to sense infrared light may be used along with a ULS.

As evident from the foregoing description, the methods and processes described herein may be tied to a sensory-and-logic system of one or more machines. Such methods and processes may be implemented as a computer-application program or service, an application-programming interface (API), a library, firmware, and/or other computer-program product. FIGS. 1A and 1B show one, non-limiting example of a sensory-and-logic system to enact the methods and processes described herein. However, these methods and process may also be enacted on sensory-and-logic systems of other configurations and form factors, as shown schematically in FIG. 4.

Figure 4:
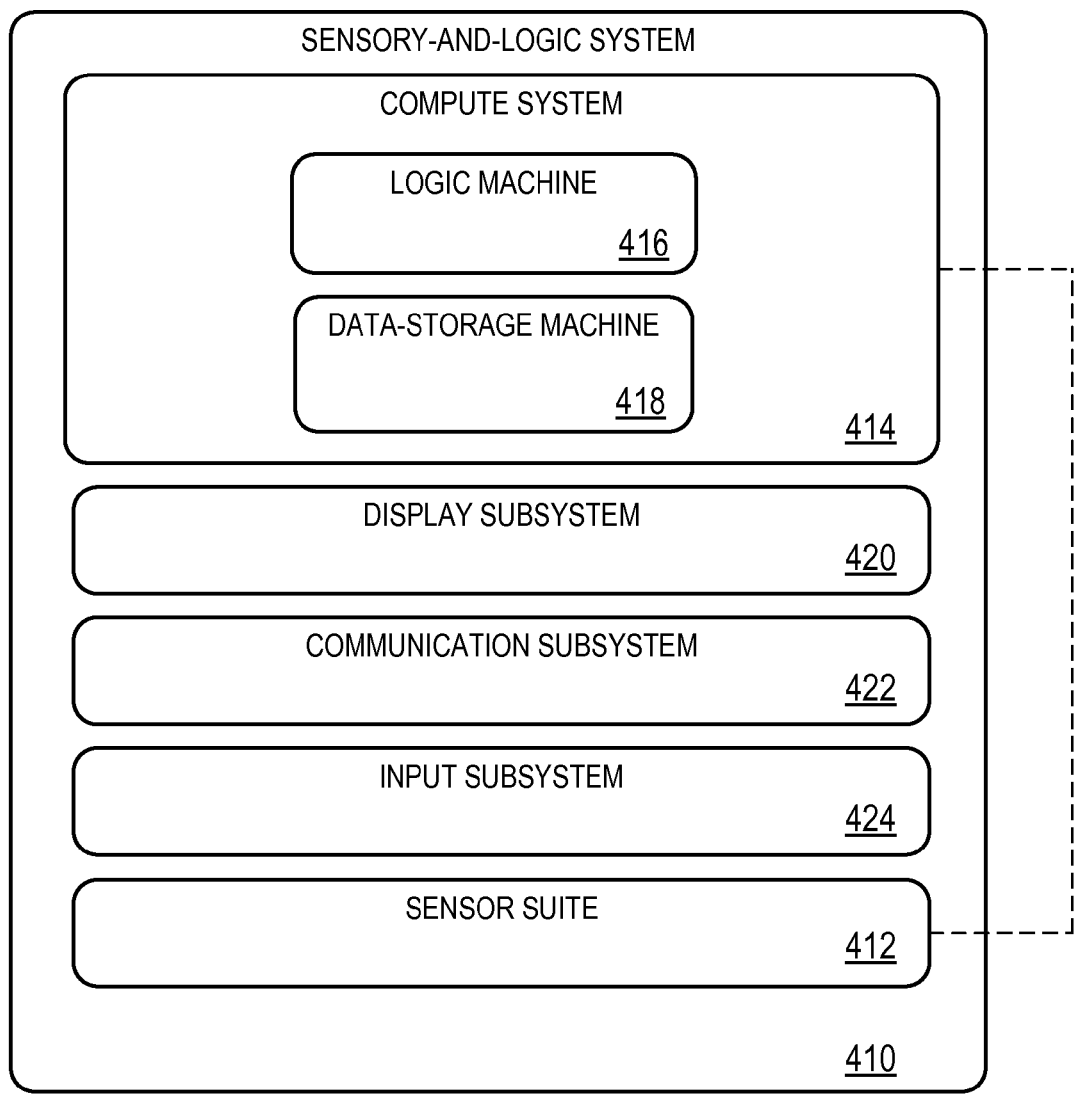
FIG. 4 schematically shows a form-agnostic sensory-and-logic system.

FIG. 4 schematically shows a form-agnostic sensory-and-logic system 410 that includes a sensor suite 412 operatively coupled to a compute system 414. The compute system includes a logic machine 416 and a data-storage machine 418. The compute system is operatively coupled to a display subsystem 420, a communication subsystem 422, an input subsystem 424, and/or other components not shown in FIG. 4.

Logic machine 416 includes one or more physical devices configured to execute instructions. The logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 416 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of a logic machine optionally may be distributed among two or more separate devices, which may be remotely located and/or configured for coordinated processing. Aspects of a logic machine may be virtualized and executed by remotely accessible, networked computing devices in a cloud-computing configuration.

Data-storage machine 418 includes one or more physical devices configured to hold instructions executable by logic machine 416 to implement the methods and processes described herein. When such methods and processes are implemented, the state of the data-storage machine may be transformed—e.g., to hold different data. The data-storage machine may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The data-storage machine may include volatile, nonvolatile, dynamic, static, read/write, read-only, random-access, sequential-access, location-addressable, file-addressable, and/or content-addressable devices.

It will be appreciated that data-storage machine 418 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 416 and data-storage machine 418 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 420 may be used to present a visual representation of data held by data-storage machine 418. This visual representation may take the form of a graphical user interface (GUI). As the herein described methods and processes change the data held by the storage machine, and thus transform the state of the storage machine, the state of display subsystem 420 may likewise be transformed to visually represent changes in the underlying data. Display subsystem 420 may include one or more display subsystem devices utilizing virtually any type of technology. Such display subsystem devices may be combined with logic machine 416 and/or data-storage machine 418 in a shared enclosure, or such display subsystem devices may be peripheral display subsystem devices. Display 20 of FIGS. 1A and 1B is an example of display subsystem 420.

Communication subsystem 422 may be configured to communicatively couple compute system 414 to one or more other computing devices. The communication subsystem may include wired and/or wireless communication devices compatible with one or more different communication protocols. As non-limiting examples, the communication subsystem may be configured for communication via a wireless telephone network, a local- or wide-area network, and/or the Internet. Communication suite 24 of FIGS. 1A and 1B is an example of communication subsystem 422.

Input subsystem 424 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board.

Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. Touch screen sensor 32 and push buttons 34 of FIGS. 1A and 1B are examples of input subsystem 424.

Sensor suite 412 may include one or more different sensors—e.g., a touch-screen sensor, push-button sensor, microphone, visible light sensor, ultraviolet sensor, ambient-temperature sensor, contact sensors, optical pulse-rate sensor, accelerometer, gyroscope, magnetometer, and/or GPS receiver—as described above with reference to FIGS. 1A and 1B.

It will be understood that the configurations and approaches described herein are exemplary in nature, and that these specific implementations or examples are not to be taken in a limiting sense, because numerous variations are feasible. The specific routines or methods described herein may represent one or more processing strategies. As such, various acts shown or described may be performed in the sequence shown or described, in other sequences, in parallel, or omitted.

The subject matter of this disclosure includes all novel and non-obvious combinations and sub-combinations of the various processes, systems and configurations, and other features, functions, acts, and/or properties disclosed herein, as well as any and all equivalents thereof.

The invention claimed is:

1. A method of measuring ultraviolet light, comprising:
observing an ultraviolet portion of ambient light with an ultraviolet light sensor;
measuring an intensity of a visible portion of the ambient light with a visible light sensor; and
estimating an intensity of the ultraviolet portion of the ambient light based on the measured intensity of the visible portion of the ambient light if the observed ultraviolet portion of the ambient light exceeds a threshold intensity.

2. The method of claim 1, further comprising estimating the intensity of the ultraviolet portion of the ambient light to be negligible regardless of the measured intensity of the visible portion of the ambient light if the observed ultraviolet portion of the ambient light is less than the threshold intensity.

3. The method of claim 1, wherein the visible light sensor is sensitive to visible light and not ultraviolet light.

4. The method of claim 1, further comprising estimating an index of the ultraviolet portion of the ambient light based on the estimated intensity of the ultraviolet portion of the ambient light.

5. The method of claim 1, wherein the ultraviolet light sensor and the visible light sensor comprise a single light sensor having a first portion sensitive to ultraviolet light and not visible light, and a second portion sensitive to the visible light and not the ultraviolet light.

6. The method of claim 1, wherein the ultraviolet light sensor includes a photosensitive surface doped such that the photosensitive surface is sensitive to ultraviolet light and not visible light.

7. The method of claim 1, wherein the visible light sensor includes a photosensitive surface doped such that the photosensitive surface is sensitive to visible light and not ultraviolet light.

8. The method of claim 1, wherein a material that attenuates ultraviolet light shields the ultraviolet light sensor from the ambient light.

9. The method of claim 1, wherein the ultraviolet light sensor is configured to output a signal proportional to the observed ultraviolet portion of the ambient light.

10. The method of claim 1, further comprising:
measuring an intensity of the ultraviolet portion of the ambient light with the ultraviolet light sensor; and
updating the estimated intensity of the ultraviolet portion based on the measured intensity of the ultraviolet portion.

11. A sensory-and-logic system, comprising:
a visible light sensor configured to sense visible light;
an ultraviolet light sensor configured to sense ultraviolet light;
a logic machine;
a data-storage machine holding instructions executable by the logic machine to:
observe whether an ultraviolet portion of ambient light received at the ultraviolet sensor exceeds a threshold intensity;
measure an intensity of a visible portion of the ambient light received at the visible light sensor; and
estimate an intensity of the ultraviolet portion of the ambient light based on the measured intensity of the visible portion of the ambient light if the observed ultraviolet portion of the ambient light exceeds the threshold intensity.

12. The sensory-and-logic system of claim 11, wherein the data-storage machine further holds instructions executable by the logic machine to estimate the intensity of the ultraviolet portion of the ambient light to be negligible regardless of the measured intensity of the visible portion of the ambient light if the observed ultraviolet portion of the ambient light is less than the threshold intensity.

13. The sensory-and-logic system of claim 11, wherein the data-storage machine further holds instructions executable by the logic machine to estimate an index of the ultraviolet portion of the ambient light based on the estimated intensity of the ultraviolet portion of the ambient light.

14. The sensory-and-logic system of claim 11, wherein the ultraviolet light sensor and the visible light sensor comprise a single light sensor having a first portion sensitive to ultraviolet light and not visible light, and a second portion sensitive to the visible light and not the ultraviolet light.

15. The sensory-and-logic system of claim 11, wherein the data-storage machine further holds instructions executable by the logic machine to report the estimated intensity of the ultraviolet portion of the ambient light via an output device.

16. The sensory-and-logic system of claim 11, wherein the data-storage machine further holds instructions executable by the logic machine to issue an alert via an output device if the estimated intensity of the ultraviolet portion of the ambient light exceeds a threshold.

17. A method of measuring ultraviolet light, comprising:
receiving ambient light at an ambient light sensor;
measuring an intensity of a non-ultraviolet portion of the ambient light based on output from the ambient light sensor; and
estimating an intensity of an ultraviolet portion of the ambient light based on the measured intensity of the non-ultraviolet portion.

18. The method of claim 17, wherein the ambient light sensor is configured to sense visible light and not ultraviolet light.

19. The method of claim 18, further comprising determining a location of the ambient light sensor and estimating the intensity of the ultraviolet portion of the ambient light to be negligible regardless of the measured intensity of the non-ultraviolet portion of the ambient light if the location is indoors.

20. The method of claim 19, wherein the location is determined by a global positioning system.

* * * * *